(12) United States Patent
Seo et al.

(10) Patent No.: US 7,783,160 B2
(45) Date of Patent: Aug. 24, 2010

(54) RECORDING MEDIUM HAVING DATA STRUCTURE FOR MANAGING REPRODUCTION OF INTERLEAVED MULTIPLE REPRODUCTION PATH VIDEO DATA RECORDED THEREON AND RECORDING AND REPRODUCING METHODS AND APPARATUSES

(75) Inventors: Kang Soo Seo, Kyunggi-do (KR);
Byung Jin Kim, Kyunggi-do (KR);
Soung Hyun Um, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 1037 days.

(21) Appl. No.: 10/642,635

(22) Filed: Aug. 19, 2003

(65) Prior Publication Data

US 2004/0096196 A1    May 20, 2004

(30) Foreign Application Priority Data

Nov. 20, 2002    (KR) ............................... 2002-72515

(51) Int. Cl.
*H04N 7/00*    (2006.01)

(52) U.S. Cl. ....................................................... 386/95

(58) Field of Classification Search ................... 386/96, 386/125, 83, 46, 95, 126
See application file for complete search history.

(56) References Cited

U.S. PATENT DOCUMENTS

| 5,521,898 A | 5/1996 | Ogasawara |
| 5,559,808 A | 9/1996 | Kostreski et al. |
| 5,602,956 A | 2/1997 | Suzuki et al. |
| 5,651,010 A | 7/1997 | Kostreski et al. |
| 5,729,549 A | 3/1998 | Kostreski et al. |
| 5,732,185 A | 3/1998 | Hirayama et al. |
| 5,742,569 A | 4/1998 | Yamamoto et al. |
| 5,747,136 A | 5/1998 | Shono et al. |
| 5,771,334 A | 6/1998 | Yamauchi et al. |
| 5,784,528 A * | 7/1998 | Yamane et al. .............. 386/112 |
| 5,819,003 A | 10/1998 | Hirayama et al. |
| 5,835,493 A | 11/1998 | Magee et al. |
| 5,854,873 A | 12/1998 | Mori et al. |

(Continued)

FOREIGN PATENT DOCUMENTS

CA    2 377 690    11/2001

(Continued)

OTHER PUBLICATIONS

International Search Report dated Nov. 26, 2003.

(Continued)

*Primary Examiner*—Thai Tran
*Assistant Examiner*—Tat Chio
(74) *Attorney, Agent, or Firm*—Harness, Dickey & Pierce, P.L.C.

(57) ABSTRACT

The recording medium has a data structure for managing reproduction of at least multiple reproduction path video data recorded on the recording medium. The recording medium includes a data area storing at least a portion of the multiple reproduction path video data. The multiple reproduction path video data is divided into one or more interleaving units, and each interleaving unit is associated with one of the reproduction paths. Each interleaving unit starts and ends with a reproduction path change point, and the interleaving units associated with different reproduction paths are interleaved in the data area.

28 Claims, 8 Drawing Sheets

U.S. PATENT DOCUMENTS

| | | | |
|---|---|---|---|
| 5,870,523 A * | 2/1999 | Kikuchi et al. ............... 386/95 |
| 5,877,817 A | 3/1999 | Moon |
| 5,884,004 A | 3/1999 | Sato et al. |
| 5,895,124 A | 4/1999 | Tsuga et al. |
| 5,909,257 A | 6/1999 | Ohishi et al. |
| 5,913,010 A * | 6/1999 | Kaneshige et al. ............ 386/70 |
| 5,940,255 A | 8/1999 | Uwabo et al. |
| 5,949,792 A | 9/1999 | Yasuda et al. |
| 5,953,187 A | 9/1999 | Uwabo et al. |
| 5,987,126 A | 11/1999 | Okuyama et al. |
| 5,999,698 A | 12/1999 | Nakai et al. |
| 6,031,962 A * | 2/2000 | Sawabe et al. ............... 386/96 |
| 6,035,095 A | 3/2000 | Kaneshige et al. |
| 6,064,796 A | 5/2000 | Nakamura et al. |
| 6,067,400 A | 5/2000 | Saeki et al. |
| 6,167,189 A | 12/2000 | Taira et al. |
| 6,181,870 B1 | 1/2001 | Okada et al. |
| 6,181,872 B1 | 1/2001 | Yamane et al. |
| 6,195,726 B1 | 2/2001 | Hogan |
| 6,219,488 B1 | 4/2001 | Mori et al. |
| 6,222,805 B1 | 4/2001 | Mori et al. |
| 6,285,825 B1 | 9/2001 | Miwa et al. |
| 6,321,027 B2 | 11/2001 | Honjo |
| 6,336,002 B1 | 1/2002 | Yamauchi et al. |
| 6,343,062 B1 | 1/2002 | Furukawa et al. |
| 6,351,442 B1 | 2/2002 | Tagawa et al. |
| 6,353,613 B1 | 3/2002 | Kubota et al. |
| 6,360,055 B1 | 3/2002 | Kaneshige et al. |
| 6,377,747 B1 | 4/2002 | Murase et al. |
| 6,385,388 B1 | 5/2002 | Lewis et al. |
| 6,385,389 B1 | 5/2002 | Maruyama et al. |
| 6,385,394 B1 | 5/2002 | Okada et al. |
| 6,385,398 B1 | 5/2002 | Matsumoto |
| 6,393,196 B1 | 5/2002 | Yamane et al. |
| 6,393,574 B1 | 5/2002 | Kashiwagi et al. |
| 6,415,101 B1 | 7/2002 | DeCarmo et al. |
| 6,424,797 B1 | 7/2002 | Murase et al. |
| 6,445,872 B1 | 9/2002 | Sano et al. |
| 6,470,140 B1 * | 10/2002 | Sugimoto et al. ............. 386/95 |
| 6,470,460 B1 | 10/2002 | Kashiwagi et al. |
| 6,480,669 B1 * | 11/2002 | Tsumagari et al. ............ 386/95 |
| 6,504,996 B1 | 1/2003 | Na et al. |
| 6,515,101 B1 | 2/2003 | Sheares |
| 6,546,195 B2 | 4/2003 | Kashiwagi et al. |
| 6,556,774 B2 | 4/2003 | Tsumagari et al. |
| 6,564,006 B1 | 5/2003 | Mori et al. |
| 6,567,608 B2 | 5/2003 | Mori et al. |
| 6,573,819 B1 | 6/2003 | Oshima et al. |
| 6,584,277 B2 | 6/2003 | Tsumagari et al. |
| 6,603,517 B1 | 8/2003 | Shen et al. |
| 6,618,396 B1 | 9/2003 | Kondo et al. |
| 6,654,543 B2 | 11/2003 | Ando et al. |
| 6,788,883 B1 | 9/2004 | Park et al. |
| 6,801,713 B1 | 10/2004 | Yagawa et al. |
| 6,901,078 B2 | 5/2005 | Morris |
| 6,904,227 B1 | 6/2005 | Yamamoto et al. |
| 7,024,102 B1 | 4/2006 | Inoshita et al. |
| 7,072,573 B2 | 7/2006 | Okada et al. |
| 7,106,946 B1 * | 9/2006 | Kato ........................ 386/69 |
| 7,124,303 B2 | 10/2006 | Candelore et al. |
| 7,236,687 B2 | 6/2007 | Kato et al. |
| 7,477,833 B2 * | 1/2009 | Kato et al. ................. 386/125 |
| 2001/0033517 A1 | 10/2001 | Ando et al. |
| 2001/0038745 A1 | 11/2001 | Sugimoto et al. |
| 2001/0043790 A1 | 11/2001 | Saeki et al. |
| 2001/0053280 A1 | 12/2001 | Yamauchi et al. |
| 2002/0015383 A1 | 2/2002 | Ueno |
| 2002/0015581 A1 | 2/2002 | Ando et al. |
| 2002/0021761 A1 | 2/2002 | Zhang et al. |
| 2002/0031336 A1 | 3/2002 | Okada et al. |
| 2002/0044757 A1 | 4/2002 | Kawamura et al. |
| 2002/0046328 A1 | 4/2002 | Okada |
| 2002/0076201 A1 | 6/2002 | Tsumagari et al. |
| 2002/0097981 A1 | 7/2002 | Seo et al. |
| 2002/0097984 A1 | 7/2002 | Abecassis |
| 2002/0106196 A1 | 8/2002 | Yamauchi et al. |
| 2002/0126991 A1 | 9/2002 | Kawamura et al. |
| 2002/0127002 A1 | 9/2002 | Mori et al. |
| 2002/0131767 A1 | 9/2002 | Auwens et al. |
| 2002/0145702 A1 | 10/2002 | Kato et al. |
| 2002/0150383 A1 | 10/2002 | Kato et al. |
| 2002/0159368 A1 | 10/2002 | Noda et al. |
| 2002/0180803 A1 | 12/2002 | Kaplan et al. |
| 2002/0196365 A1 | 12/2002 | Cho et al. |
| 2002/0197059 A1 | 12/2002 | Cho et al. |
| 2003/0002194 A1 | 1/2003 | Andoh |
| 2003/0026597 A1 | 2/2003 | Cho et al. |
| 2003/0113096 A1 | 6/2003 | Taira et al. |
| 2003/0118327 A1 | 6/2003 | Um et al. |
| 2003/0123849 A1 | 7/2003 | Nallur et al. |
| 2003/0133509 A1 | 7/2003 | Yanagihara et al. |
| 2003/0161615 A1 | 8/2003 | Tsumagari et al. |
| 2003/0221055 A1 | 11/2003 | Okada |
| 2003/0235403 A1 | 12/2003 | Seo et al. |
| 2003/0235404 A1 | 12/2003 | Seo et al. |
| 2003/0235405 A1 | 12/2003 | Seo et al. |
| 2004/0001700 A1 | 1/2004 | Seo et al. |
| 2004/0068606 A1 | 4/2004 | Kim et al. |
| 2004/0086261 A1 | 5/2004 | Hanes |
| 2004/0156621 A1 | 8/2004 | Seo et al. |
| 2004/0179819 A1 | 9/2004 | Cho et al. |
| 2004/0179820 A1 | 9/2004 | Kashiwagi et al. |
| 2004/0179827 A1 | 9/2004 | Cho et al. |
| 2004/0247290 A1 | 12/2004 | Seo et al. |
| 2004/0252975 A1 | 12/2004 | Cho et al. |
| 2005/0019007 A1 | 1/2005 | Kato et al. |
| 2005/0025459 A1 | 2/2005 | Kato et al. |
| 2005/0025461 A1 | 2/2005 | Kato et al. |
| 2005/0036763 A1 | 2/2005 | Kato et al. |
| 2006/0098936 A1 | 5/2006 | Ikeda et al. |
| 2006/0222340 A1 | 10/2006 | Yamauchi et al. |

FOREIGN PATENT DOCUMENTS

| | | |
|---|---|---|
| CN | 1134583 | 10/1996 |
| CN | 1150293 | 5/1997 |
| CN | 1197573 A | 10/1998 |
| CN | 1220458 | 6/1999 |
| CN | 1237852 | 12/1999 |
| CN | 1251461 | 4/2000 |
| CN | 1136546 | 1/2004 |
| EP | 0 689 206 | 12/1994 |
| EP | 0723216 | 7/1996 |
| EP | 0737980 | 10/1996 |
| EP | 0 788 105 | 8/1997 |
| EP | 0 798 722 | 10/1997 |
| EP | 0 814 475 | 12/1997 |
| EP | 0 875 856 | 4/1998 |
| EP | 0836183 | 4/1998 |
| EP | 0836189 | 4/1998 |
| EP | 0 847 195 | 6/1998 |
| EP | 0 847 198 | 6/1998 |
| EP | 0873022 | 10/1998 |
| EP | 0 896 337 | 2/1999 |
| EP | 0 903 744 | 3/1999 |
| EP | 0917355 | 5/1999 |
| EP | 0918438 | 5/1999 |
| EP | 0920203 | 6/1999 |
| EP | 0940983 | 9/1999 |
| EP | 0 961 279 | 12/1999 |
| EP | 1003338 A2 | 5/2000 |
| EP | 1 043 724 | 10/2000 |
| EP | 1081885 | 3/2001 |
| EP | 1 120 789 | 8/2001 |

| | | |
|---|---|---|
| EP | 1126454 | 8/2001 |
| EP | 1198132 | 4/2002 |
| EP | 1198133 | 4/2002 |
| EP | 1202568 | 5/2002 |
| EP | 1 469 677 | 10/2004 |
| GB | 2351888 | 1/2001 |
| JP | 64-003781 | 1/1989 |
| JP | 01-116819 | 5/1989 |
| JP | 08-088832 | 4/1996 |
| JP | 08-235833 | 9/1996 |
| JP | 8-511146 | 11/1996 |
| JP | 09-023403 | 1/1997 |
| JP | 09-251759 | 9/1997 |
| JP | 10-032780 | 2/1998 |
| JP | 10-040667 | 2/1998 |
| JP | 10-051737 | 2/1998 |
| JP | 10-155138 | 6/1998 |
| JP | 10-255443 | 9/1998 |
| JP | 10-269698 | 10/1998 |
| JP | 10-271449 | 10/1998 |
| JP | 10-299698 | 11/1998 |
| JP | 10-340570 | 12/1998 |
| JP | 11-041563 | 2/1999 |
| JP | 11066813 | 3/1999 |
| JP | 11-103444 | 4/1999 |
| JP | 11-134812 | 5/1999 |
| JP | 11-185463 | 7/1999 |
| JP | 11-259976 | 9/1999 |
| JP | 11-346341 | 12/1999 |
| JP | 11341443 | 12/1999 |
| JP | 2000-030414 | 1/2000 |
| JP | 2000-041066 | 2/2000 |
| JP | 2000-069437 | 3/2000 |
| JP | 2000-113602 | 4/2000 |
| JP | 2000-149514 | 5/2000 |
| JP | 2000-235779 | 8/2000 |
| JP | 2000-293938 | 10/2000 |
| JP | 2000-299836 | 10/2000 |
| JP | 2000-348442 | 12/2000 |
| JP | 2001 024985 | 1/2001 |
| JP | 2001 111944 | 1/2001 |
| JP | 2006 503400 | 1/2001 |
| JP | 2001024973 | 1/2001 |
| JP | 2001-067802 | 3/2001 |
| JP | 2001-111929 | 4/2001 |
| JP | 2001-111960 | 4/2001 |
| JP | 2001-169246 | 6/2001 |
| JP | 2001-297535 | 10/2001 |
| JP | 2001-332006 | 11/2001 |
| JP | 2002 083486 | 3/2002 |
| JP | 2002-112179 | 4/2002 |
| JP | 2002-150685 | 5/2002 |
| JP | 2002-158971 | 5/2002 |
| JP | 2002-158972 | 5/2002 |
| JP | 2002 158974 | 5/2002 |
| JP | 2002-171472 | 6/2002 |
| JP | 2002 176623 | 6/2002 |
| JP | 2002-216460 | 8/2002 |
| JP | 2002-222581 | 8/2002 |
| JP | 2003-087744 | 3/2003 |
| JP | 2003-116100 | 4/2003 |
| KR | 10-1999-0022858 | 10/1997 |
| KR | 10-2000-0031861 | 6/2000 |
| KR | 10-2000-0055028 | 9/2000 |
| KR | 10-2000-0056179 | 9/2000 |
| KR | 10-2000-0065876 | 11/2000 |
| KR | 10-2001-0022702 | 3/2001 |
| KR | 10-0294884 | 4/2001 |
| KR | 10-2001-0098101 | 11/2001 |
| KR | 2001-098007 | 11/2001 |
| KR | 10-2001-0107578 | 12/2001 |
| KR | 10-2002-0006674 | 1/2002 |
| KR | 10-2002-0020919 | 3/2002 |
| KR | 10-2002-0097454 | 12/2002 |
| KR | 10-2002-0097455 | 12/2002 |
| KR | 10-2004-0000290 | 1/2004 |
| KR | 10-2004-0030992 | 4/2004 |
| KR | 10-2004-0030994 | 4/2004 |
| KR | 10-2004-0030995 | 4/2004 |
| KR | 10-2004-0041581 | 5/2004 |
| TW | 391548 | 5/2000 |
| WO | WO 97/06531 | 2/1997 |
| WO | WO 97/13364 | 4/1997 |
| WO | WO 97/13365 | 4/1997 |
| WO | WO 97/13366 | 4/1997 |
| WO | WO 97/31374 | 8/1997 |
| WO | WO 97/39451 | 10/1997 |
| WO | WO 98/00952 | 1/1998 |
| WO | WO 99/08281 | 2/1999 |
| WO | WO 99/34601 | 7/1999 |
| WO | WO 00/02195 | 1/2000 |
| WO | WO 00/05883 | 2/2000 |
| WO | WO 00/42515 | 7/2000 |
| WO | WO 00/62295 | 10/2000 |
| WO | WO 01/80239 | 10/2001 |
| WO | WO 01/82604 | 11/2001 |
| WO | WO 01/82606 A1 | 11/2001 |
| WO | WO 01/82609 A1 | 11/2001 |
| WO | WO 01/82610 | 11/2001 |
| WO | WO 2004/001750 | 12/2003 |
| WO | WO 2004/001753 | 12/2003 |
| WO | WO 2004-042723 | 5/2004 |
| WO | WO 2004/045206 | 5/2004 |
| WO | WO 2004-075183 | 9/2004 |
| WO | WO 2004/077417 | 9/2004 |
| WO | WO 2004/079736 | 9/2004 |
| WO | WO 2004/081939 | 9/2004 |
| WO | WO 2004/086371 | 10/2004 |
| WO | WO 2004/001748 | 12/2008 |

OTHER PUBLICATIONS

Russian Office Action dated Nov. 14, 2006.
Canadian Office Action dated Dec. 19, 2007.
EPO Search Report dated Mar. 31, 2008 for counterpart EPO Application No. 03761863.4.
Japanese Office Action dated May 7, 2008 for counterpart JP Application No. 2004-517368.
Japanese Office Action dated May 7, 2008 for counterpart JP Application No. 2004-517390.
Chinese Office Action dated Dec. 14, 2007.
Japanese Office Action dated Jan. 22, 2008.
European Search Report dated Dec. 28, 2007.
European Search Report dated Jan. 2, 2008.
United States Office Action dated Jan. 2, 2008.
United States Office Action dated Jan. 28, 2008.
Office Action received Nov. 4, 2008 by Japanese Patent Office for counterpart Japanese application.
Japanese Patent Office Action dated May 20, 2008 for a counterpart Japanese Patent Application.
Japanese Patent Office Action dated Apr. 22, 2008 for a counterpart Japanese Patent Application.
Office Action dated Jul. 7, 2009 by Japanese Patent Office for counterpart Japanese application.
Office Action dated Jul. 9, 2009 by Australian Patent Office for counterpart Australian application.
Office Action dated Jul. 17, 2009 by Japanese Patent Office for counterpart Japanese application.
Office Action dated Oct. 8, 2009 by the European Patent Office for counterpart European application #03733603.
Office Action dated Oct. 8, 2009 by the European Patent Office for counterpart European application #03811859.
Office Action dated 14, 2009 by the Australian Patent Office for counterpart Australian application.
Office Action dated Dec. 31, 2009 by USPTO for counterpart U.S. Appl. No. 10/702,557.

Office Action dated Oct. 15, 2009 by the USPTO for counterpart U.S. Appl. No. 10/607,984.

Office Action dated Nov. 30, 2009 by the European Patent Office for counterpart European application No. 03811549.9.

Search Report dated Feb. 4, 2010 from the European Patent Office for counterpart European Application 03761845.1.

* cited by examiner

Case 1 : Fixed Interleaving Unit

RECORDING MEDIUM HAVING DATA STRUCTURE FOR MANAGING REPRODUCTION OF INTERLEAVED MULTIPLE REPRODUCTION PATH VIDEO DATA RECORDED THEREON AND RECORDING AND REPRODUCING METHODS AND APPARATUSES

BACKGROUND OF THE INVENTION

1. Field of the Invention

The present invention relates to a recording medium having a data structure for managing reproduction of at least multiple reproduction path video data recorded thereon as well as methods and apparatuses for reproduction and recording.

2. Description of the Related Art

The standardization of new high-density read only and rewritable optical disks capable of recording large amounts of high-quality video and audio data has been progressing rapidly and new optical disk related products are expected to be commercially available on the market in the near future. The Blu-ray Disc Rewritable (BD-RE) is one example of these new optical disks.

FIG. 1 illustrates the file structure of the BD-RE. The file structure or data structure provides for managing the reproduction of the video and audio data recorded on the BD-RE. As shown, the data structure includes a root directory that contains at least one BDAV directory. The BDAV directory includes files such as 'info.bdav', 'menu.tidx', and 'mark.tidx', a PLAYLIST subdirectory in which playlist files (*.rpls and *.vpls) are stored, a CLIPINF subdirectory in which clip information files (*.clpi) are stored, and a STREAM subdirectory in which MPEG2-formatted A/V stream clip files (*.m2ts) corresponding to the clip information files are stored. In addition to illustrating the data structure of the optical disk, FIG. 1 represents the areas of the optical disk. For example, the general information file info.bdav is stored in a general information area or areas on the optical disk.

Because the BD-RE data structure and disk format as illustrated in FIG. 1 is well-known and readily available, only a brief overview of the file structure will be provided in this disclosure.

As alluded to above, the STREAM directory includes MPEG2-formatted A/V stream files called clips or clip files. The STREAM directory may also include a special type of clip referred to as a bridge-clip A/V stream file. A bridge-clip is used for making seamless connection between two or more presentation intervals selected in the clips, and generally have a small data size compared to the clips. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID (s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number). The presentation time stamp (PTS) and the source packet number (SPN) are related to an entry point in the AV stream; namely, the PTS and its related SPN point to an entry point on the AV stream. The packet pointed to is often referred to as the entry point packet.

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., presentation time stamps on an ATC or STC basis). Expressed another way, the playlist file identifies playitems, each playitem points to a clip or portion thereof and identifies the clip information file associated with the clip. The clip information file is used, among other things, to map the playitems to the clip of source packets.

A playlist directory may include real playlists (*.rpls) and virtual playlists (*.vpls). A real playlist can only use clips and not bridge-clips. Namely, the real playlist is considered as referring to parts of clips, and therefore, conceptually considered equivalent in disk space to the referred to parts of the clips. A virtual playlist can use both clips and bridge-clips, and therefore, the conceptual considerations of a real playlist do not exist with virtual playlists.

The info.bdav file is a general information file that provides general information for managing the reproduction of the A/V stream recorded on the optical disk. More specifically, the info.bdav file includes, among other things, a table of playlists that identifies the file names of the playlist in the PLAYLIST directory of the same BDAV directory.

The menu.tidx, menu.tdt1 and menu.tdt2 files store information related to menu thumbnails. The mark.tidx, mark.tdt1 and mark.tdt2 files store information that relates to mark thumbnails. Because these files are not particularly relevant to the present invention, they will not be discussed further.

The standardization for high-density read-only optical disks such as the Blu-ray ROM (BD-ROM) is still under way. An effective data structure for managing reproduction of video and audio data recorded on the high-density read-only optical disk such as a BD-ROM is not yet available.

SUMMARY OF THE INVENTION

The recording medium according to the present invention includes path management information for managing the reproduction of at least multiple reproduction path video data (e.g., different camera angles of video data).

In one exemplary embodiment, the recording medium includes a data area storing at least a portion of the multiple reproduction path video data. The multiple reproduction path video data is divided into one or more interleaving units, and each interleaving unit is associated with one of the reproduction paths. Each interleaving unit starts and ends with a reproduction path change point, and the interleaving units associated with different reproduction paths are interleaved in the data area.

In an exemplary embodiment, the multiple reproduction path video data is divided into a plurality of clip files, and each clip file includes video data associated with one of the multiple reproduction paths. Here, each clip file is divided into one or more of the interleaving units. The video data in each interleaving unit may also be divided into one or more entry points.

The recording medium according to another exemplary embodiment of the present invention, associated with any of the above described embodiment, further includes a management area storing management information. The management information includes at least one entry point map associated with each reproduction path, and each entry point map identifies entry points in the video data for the associated reproduction path. In this embodiment, each entry point map may indicate which of the identified entry points is a last entry point in an interleaved unit. Alternatively, each entry point map may indicates which of the identified entry points is a first entry point in an interleaved unit.

In another exemplary embodiment of the present invention, the recording medium includes a data area storing a plurality of clip files. Each clip file includes video data associated with one of the multiple reproduction paths, and is divided into entry points of video data. The entry points in each clip file are grouped into one or more interleaving units, and the plurality of clip files are interleaved in the data area on a interleaving unit basis. In this and the other embodiments of the present invention, each interleaved unit may include the same number of entry points, or alternatively, at least two interleaved units may have a different number of entry points.

The present invention further provides apparatuses and methods for recording and reproducing the data structure according to the present invention.

BRIEF DESCRIPTION OF THE DRAWINGS

The above features and other advantages of the present invention will be more clearly understood from the following detailed description taken in conjunction with the accompanying drawings, in which.

DESCRIPTION OF THE PREFERRED EMBODIMENTS

In order that the invention may be fully understood, preferred embodiments thereof will now be described with reference to the accompanying drawings.

Figure 1:
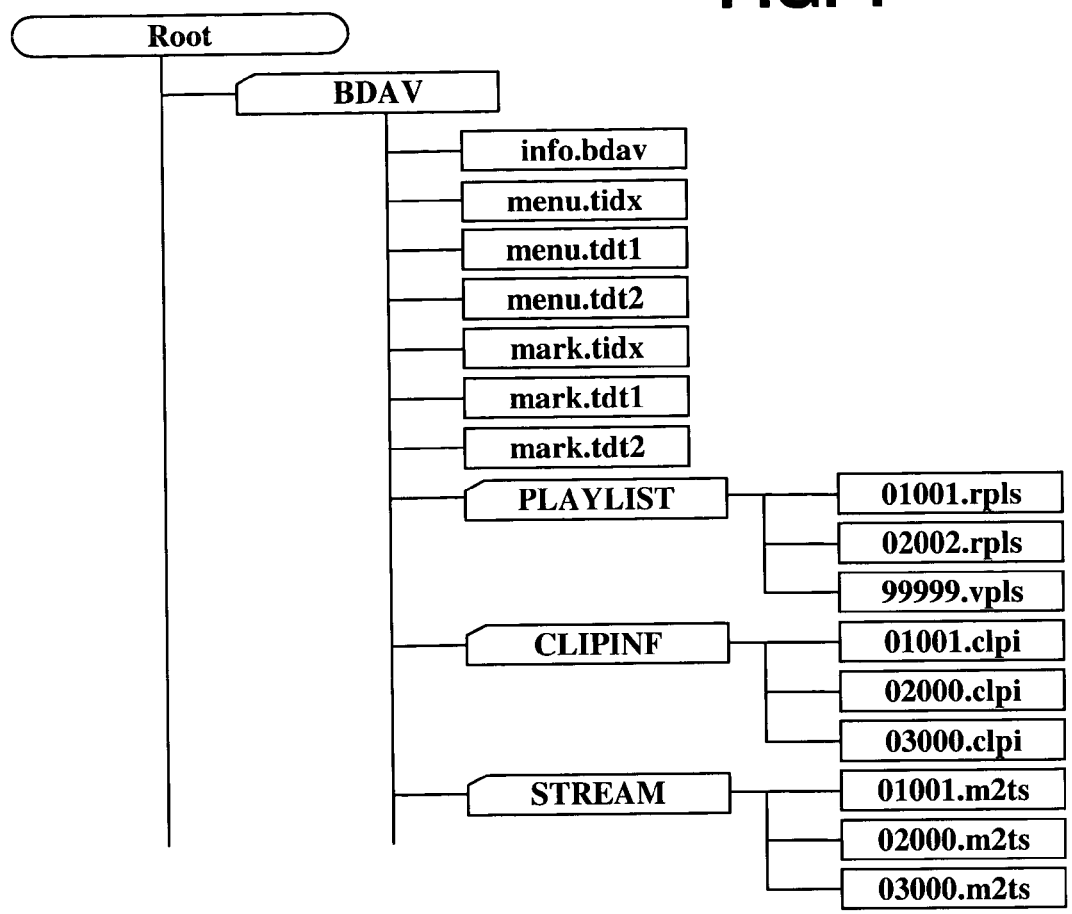
FIG. 1 illustrates the prior art file or data structure of a rewritable optical disk according to the Blu-ray Disc Rewritable (BD-RE) standard.
Figure 2:
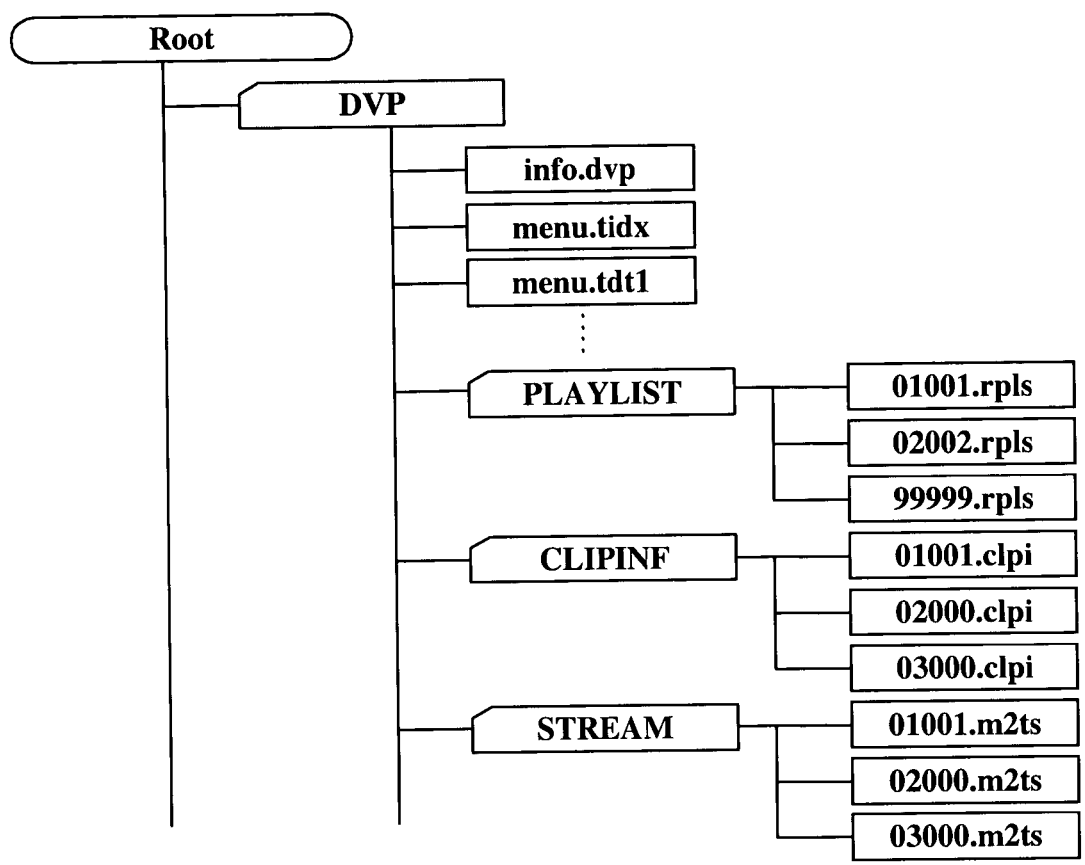
FIG. 2 illustrates an exemplary embodiment of a recording medium file or data structure according to the present invention.

A high-density optical disk, for example, a Blu-Ray ROM (BD-ROM), BD-RE, etc. in accordance with the invention may have a file or data structure for managing reproduction of video and audio data as shown in FIG. 2. Many aspects of the data structure according to the present invention shown in FIG. 2 are similar to that of the BD-RE standard discussed with respect to FIG. 1. As such these aspects will not be described in great detail.

As shown in FIG. 2, the root directory contains at least one DVP directory. The DVP directory includes a general information file info.dvp, menu files menu.tidx, menu.tdt1 among others, a PLAYLIST directory in which playlist files (e.g., real (*.rpls) and virtual (*.vpls)) are stored, a CLIPINF directory in which clip information files (*.clpi) are stored, and a STREAM directory in which MPEG2-formatted A/V stream clip files (*.m2ts), corresponding to the clip information files, are stored.

The STREAM directory includes MPEG2-formatted A/V stream files called clips or clip files. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID (s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number). The presentation time stamp (PTS) and the source packet number (SPN) are related to an entry point in the AV stream; namely, the PTS and its related SPN point to an entry point on the AV stream. The packet pointed to is often referred to as the entry point packet.

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., presentation time stamps on an ATC or STC basis). Expressed another way, the playlist file identifies playitems, each playitem points to a clip or portion thereof and identifies the clip information file associated with the clip. The clip information file is used, among other things, to map the playitems to the clip of source packets.

A playlist directory may include real playlists (*.rpls) and virtual playlists (*.vpls). A real playlist can only use clips and not bridge-clips. Namely, the real playlist is considered as referring to parts of clips, and therefore, conceptually considered equivalent in disk space to the referred to parts of the clips. A virtual playlist can use both clips and bridge-clips, and therefore, the conceptual considerations of a real playlist do not exist with virtual playlists.

The info.dvp file is a general information file that provides general information for managing the reproduction of the A/V streams recorded on the optical disk. More specifically, the info.dvp file includes, among other things, a table of playlists that identifies the file names of the playlists in the PLAYLIST directory. The info.dvp file will be discussed in greater detail below with respect to the embodiments of the present invention.

Figure 3:
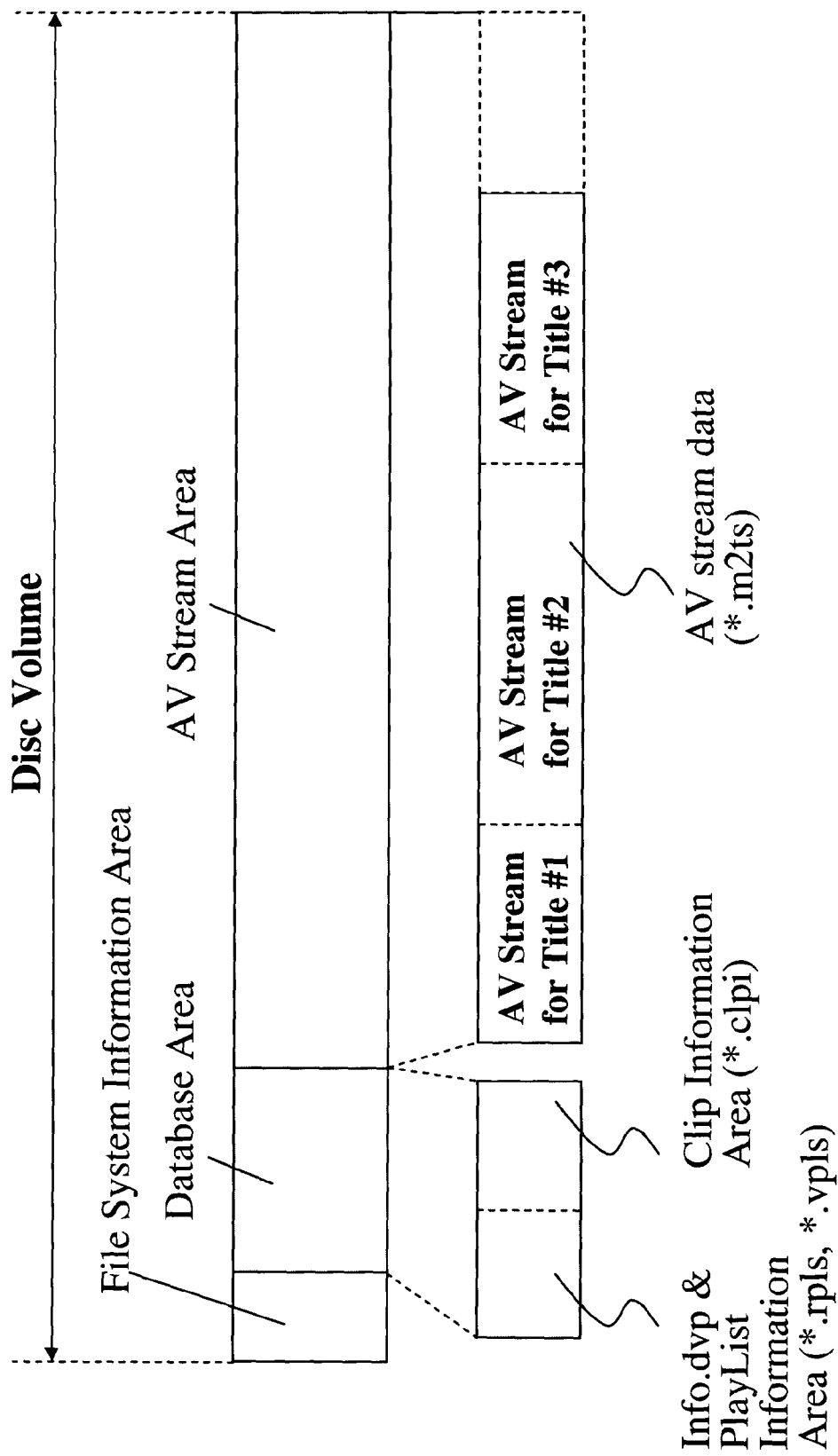
FIG. 3 illustrates an example of a recording medium having the data structure of FIG. 2 stored thereon.

In addition to illustrating the data structure of the recording medium according to an embodiment of the present invention, FIG. 2 represents the areas of the recording medium. For example, the general information file is recorded in one or more general information areas, the playlist directory is recorded in one or more playlist directory areas, each playlist in a playlist directory is recorded in one or more playlist areas of the recording medium, etc. FIG. 3 illustrates an example of a recording medium having the data structure of FIG. 2 stored thereon. As shown, the recording medium includes a file system information area, a data base area and an A/V stream area. The data base area includes a general information file and playlist information area and a clip information area. The general information file and playlist information area have the general information file recorded in a general information file area thereof, and the PLAYLIST directory and playlist files recorded in a playlist information area thereof. The clip information area has the CLIPINFO directory and associated clip information files recorded therein. The A/V stream area has the A/V streams for the various titles recorded therein.

Video and audio data are typically organized as individual titles; for example, different movies represented by the video and audio data are organized as different titles. Furthermore, a title may be organized into individual chapters in much the same way a book is often organized into chapters.

Because of the large storage capacity of the newer, high-density recording media such as BD-ROM and BD-RE optical disks, different titles, various versions of a title or portions of a title may be recorded, and therefore, reproduced from the recording media. For example, video data representing different camera angles may be recorded on the recording medium. As another example, versions of title or portions thereof associated with different languages may be recorded on the recording medium. As a still further example, a director's version and a theatrical version of a title may be recorded on the recording medium. Or, an adult version, young adult version and young child version (i.e., different parental control versions) of a title or portions of a title may be recorded on the recording medium. Each version, camera angle, etc. represents a different reproduction path, and the video data in these instances is referred to as multiple reproduction path video data. It will be appreciated that the above examples of multiple reproduction path video data are not limiting, and the present invention is applicable to any type or combination of types of multiple reproduction path video data. As will be described in detail below with respect to embodiments of the present invention, the data structures according to the present invention include path management information and/or navigation information for managing reproduction of multiple reproduction path video data recorded on the recording medium.

Figure 4:
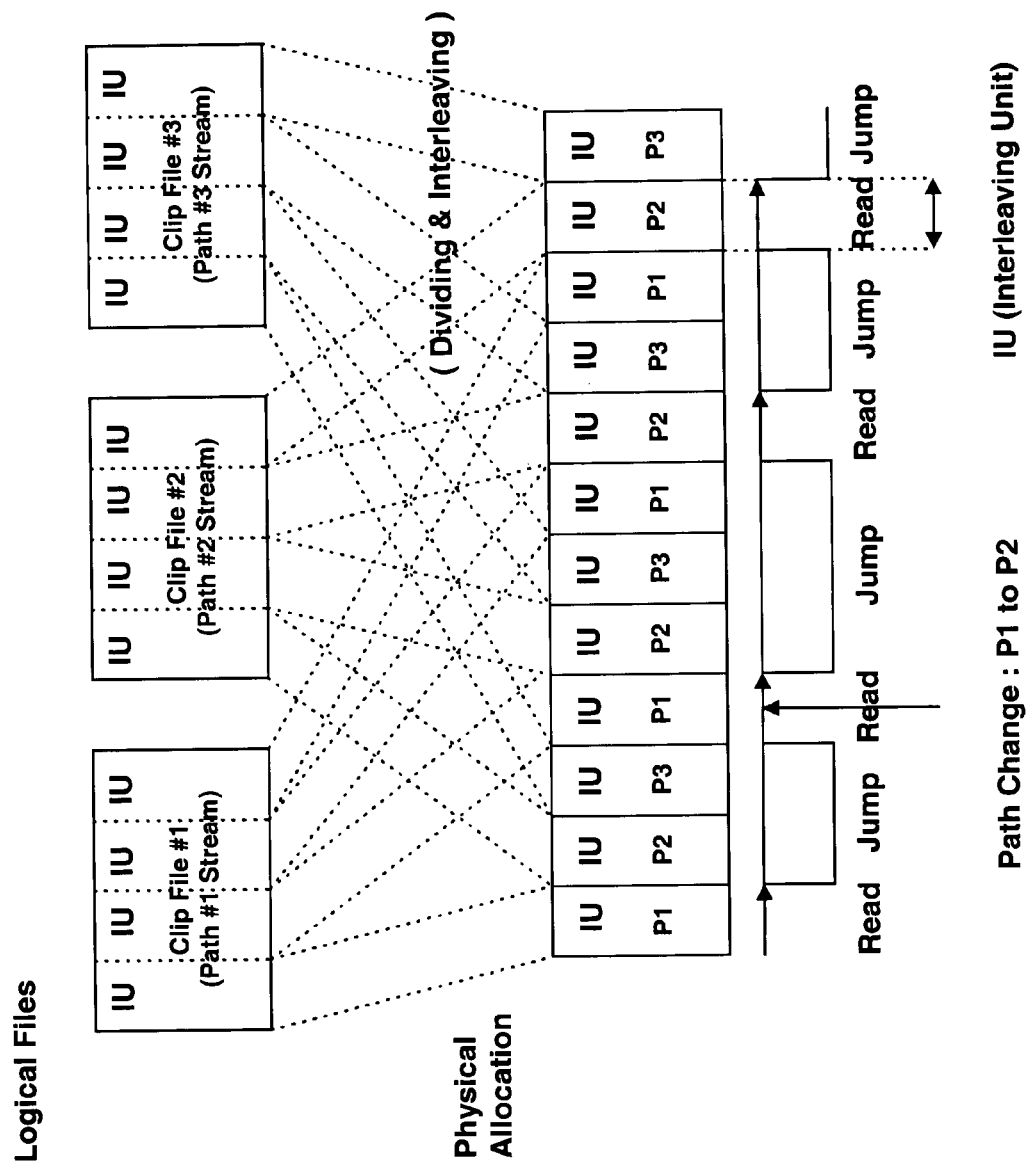
FIG. 4 illustrates an embodiment of the data structure for managing the multiple reproduction path data streams.

A first embodiment of the reproduction path management information for use in the data structure according to FIG. 2 will now be described with respect to FIG. 4. FIG. 4 illustrates an embodiment of the data structure for managing the multiple reproduction path data streams. As shown, the data stream for each reproduction path are logically managed as respective clip files. For example, data streams of a first reproduction path may be managed by a first clip file Clip File #1, data streams of a second reproduction path may be managed by a second clip file Clip File #2, and data streams of a third reproduction path may be managed by a third clip file Clip File #3, respectively.

As further shown, each of the clip files Clip File #1 to Clip File #3 is divided into a plurality of interleaving units IU so that the first through third clip files Clip File #1 to Clip File #3, and the data streams of the clip files are sequentially recorded in a physically interleaved fashion in the particular recording region of the recording medium. Namely, an interleaving unit IU from the first path P1 is recorded, then an interleaving unit IU from the second path P2 is recorded, then an interleaving unit IU from the third path P3 is recorded, etc. Each interleaving unit IU includes one or more entry points (EPs), which are referenced in an EP map of a clip information file Clip Info File corresponding to the one of the first through third clip files Clip File #1 to Clip File #3 associated with the interleaving unit IU.

When the data stream of the first reproduction path P1 is to be read and reproduced at the request of the user, the optical disc apparatus (discussed in detail below with respect to FIG. 8) reproduces the interleaving units IU associated with the first reproduction path P1, and skips the interleaving units IU of the second and third reproduction paths P2 and P3. It will be appreciated that this reproduction and jumping operation is performed based on the EP map associated with the clip file of the selected reproduction path.

When, as shown in FIG. 4, a path change to, for example, the second reproduction path P2 is requested during a reproduction of the first reproduction path P1, the optical disc apparatus completely reads out and reproduces the data stream of the first path corresponding to the interleaving unit IU being reproduced at the point in time when the path change is requested, searches for the data stream of the second reproduction path corresponding to the next interleaving unit IU, and reads out and reproduces the interleaving unit IU located in the search. As will be appreciated from the forgoing, according to this embodiment of the present invention, a change between reproduction paths takes place at an interleaving unit level. Namely, each interleaving unit starts and ends with a reproduction path change point.

Figure 5:
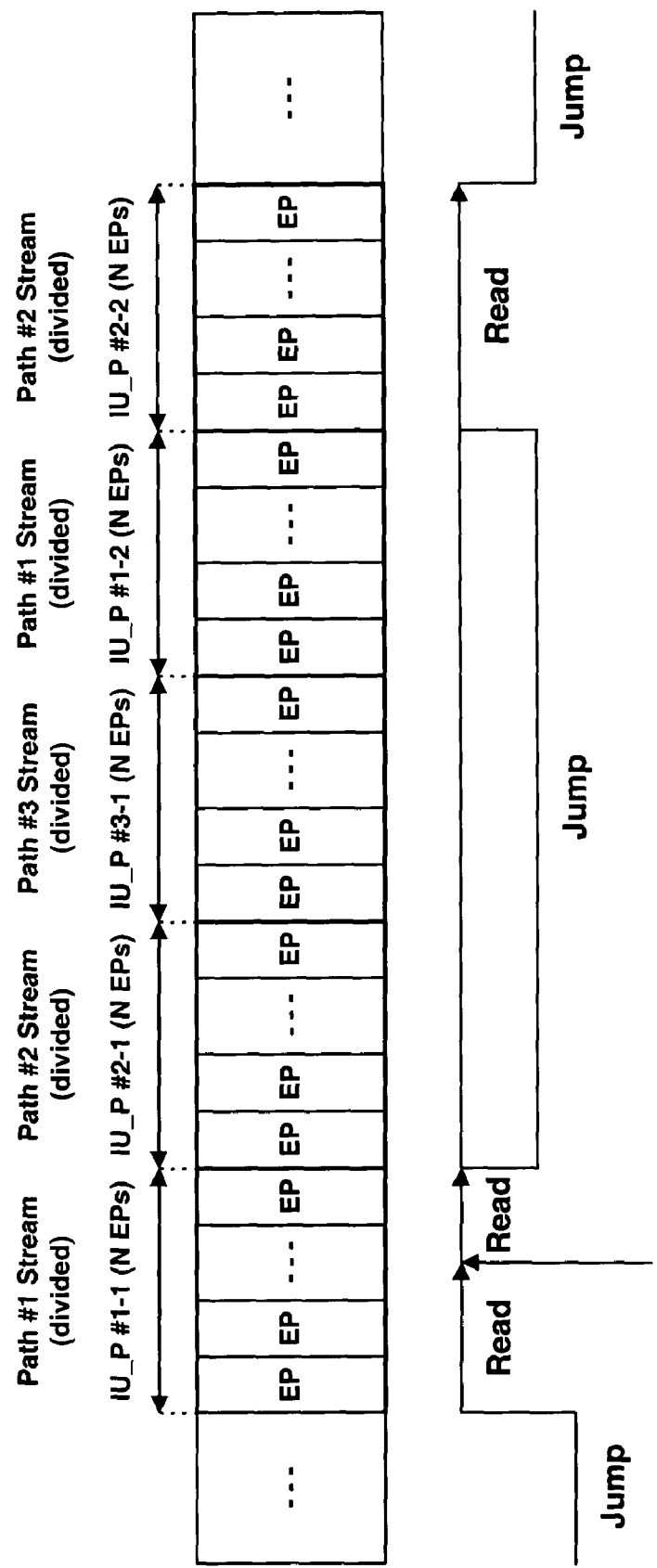
FIGS. 5 and 6 each illustrates an embodiment of the interleaving unit IU data structure according to the present invention.

FIG. 5 illustrates the interleaving unit IU data structure according to one embodiment of the present invention. As shown, a predetermined number of entry points, for example, N entry points forms each interleaving unit IU. Each entry point may have a variable time length. Accordingly, the time length of each interleaving unit IU may be variable.

Length information of each interleaving unit, IU_length, may be recorded in the clip information file Clip Info File associated with the clip file to which the interleaving unit IU belongs. Alternatively, this length information may be recorded in a play list file or a play item PlayItem.

The length of each interleaving unit should be set so as to prevent any buffer underflow from occurring during a jumping operation from the interleaving unit to another interleaving unit of the same reproduction path while preventing the buffer size from becoming excessively large.

For example, in the case of an excessively short interleaving unit length, a buffer underflow may occur during a big jumping operation. Furthermore, there is a drawback in that it is necessary to record and manage a relatively large amount of interleaving unit length information. On the other hand, in the case of an excessively long interleaving unit length, a much larger sized buffer for temporarily storing a read data stream is required.

For this reason, a system designer should design the length of each interleaving unit IU taking into consideration buffer underflow, buffer size, and efficiencies of recording and managing interleaving unit length information.

Figure 6:
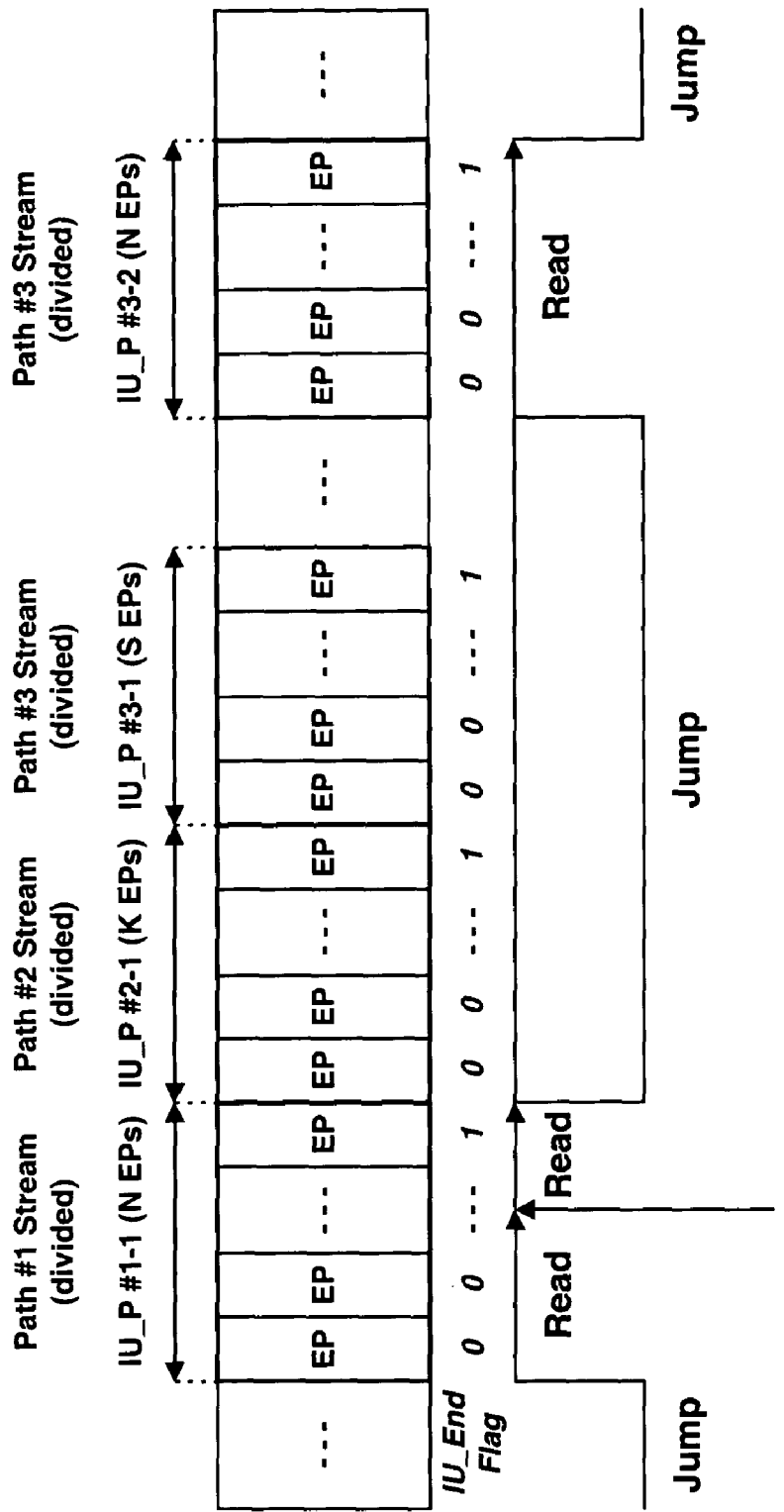

FIG. 6 illustrates the interleaving unit IU data structure according to one embodiment of the present invention. As shown, the number of entry points forming each interleaving unit IU, regardless of reproduction path, is variable. For example, FIG. 6 shows N entry points forming interleaving unit IU_P#1-1 from first reproduction path P1 and interleaving unit IU_P#3-2 from third reproduction path. P3, K entry points forming interleaving unit IU_P#2-1 from second reproduction path P2, and S entry points forming interleaving unit IU_P#3-1 from third reproduction path P3, where N≠K≠S. In one exemplary embodiment, each variable-length interleaving unit IU may correspond to an associated chapter of each clip file.

As further shown in FIG. 6, the entry point map in the clip information file associated with each clip file includes an interleaving unit end flag IU_End_Flag associated with each entry point. Each interleaving unit end flag IU_End_Flag indicates whether the associated entry point is the last entry point of an interleaving unit. For example, an interleaving unit end flag set to 1, "IU_End_Flag=1", may be recorded in association with each of the last entry points of interleaving units IUs in the EP maps, whereas an interleaving unit end flag set to 0, "IU_End_Flag=0", may be recorded in association with the entry points other than the last entry points of interleaving units in the EP maps.

When a path change to a particular path is requested during reproduction of, for example, the data streams of the entry points included in the interleaving unit IU_P#1-1 of the first clip file corresponding to the first reproduction path P1, as shown in FIG. 6, respective interleaving unit end flags IU_End_Flag of the entry points included in the interleaving unit IU_P#1-1 are identified. The data streams of the interleaving unit IU_P#1-1 are reproduced up through the data stream of the entry point identified to include an interleaving end flag IU_End_Flag=1, that is, the last entry point in the interleaving unit IU_P#1-1. Thus, the interleaving unit IU_P#1-1 is completely reproduced up through the data stream of the last entry point thereof.

After the complete reproduction of the interleaving unit IU_P#1-1, the clip information file associated with the clip file of the particular path requested to be reproduced, for example, the third reproduction path P3, is searched for the starting entry point of the next interleaving unit thereof, that is, interleaving unit IU_P#3-2. Namely, the first entry point in the third reproduction path P3 following the entry point in the third reproduction path P3 with an IU_End_Flag set to 1 is searched. The clip file corresponding to the third reproduction path P3 is then successively reproduced in a jumped fashion, starting from the starting entry point of the interleaving unit IU_P#3-2. As will be appreciated from the forgoing, a change between reproduction paths takes place at an interleaving unit level. Namely, each interleaving unit starts and ends with a reproduction path change point, and in this embodiment of the interleave unit, a flag indicates the path change points.

Thus, the data streams of the first reproduction path P1 and the data streams of the third reproduction path P3 are successively reproduced in a seamless fashion in the unit of interleaving units IU.

Alternatively, the first entry point of each interleaving unit IU is recorded with identification information representing the start of the interleaving unit IU. For example, an interleaving unit start flag set to 1, "IU_Start_Flag=1", may be recorded in association with each of the first entry points of interleaving units IUs in the EP maps, whereas an interleaving unit start flag set to 0, "IU_Start_Flag=0", may be recorded in association with the entry points other than the first entry points of interleaving units in the EP maps.

Figure 7:
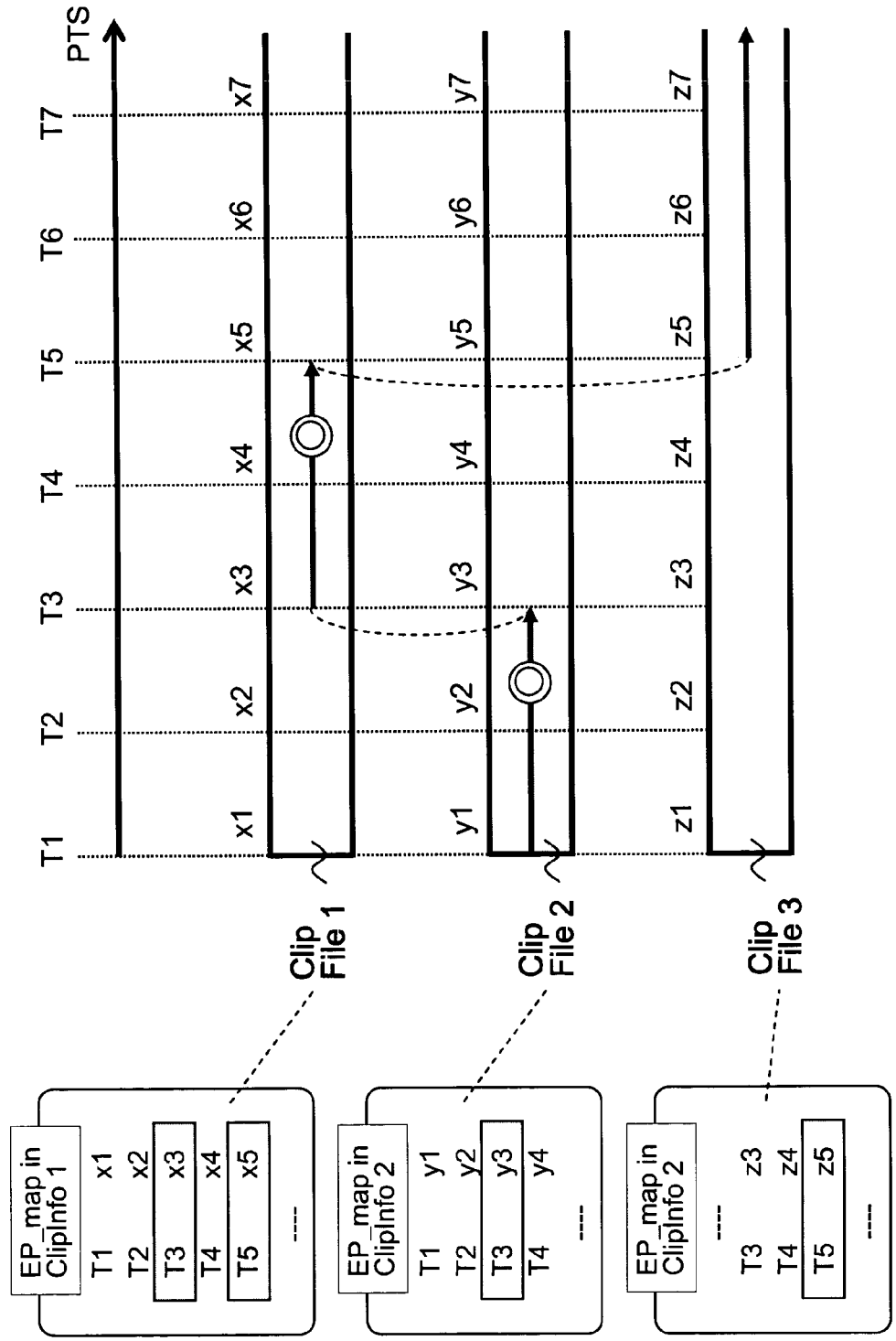
FIG. 7 illustrates the time alignment that may exist between the entry point maps for the different clip files in the embodiments of the present invention.

FIG. 7 illustrates the time alignment that exists between the EP maps for the different clip files. As discussed, an EP map maps the presentation time stamp information to a source packet. More particularly, the presentation time stamp is mapped to the address or identifier of the source packet. The address or identifier is the source packet number (SPN). FIG. 7 further shows the source packets by source packet number along the presentation time stamp axis for each clip file 1, 2, and 3. As shown, source packets in each of the EP maps 1, 2, and 3 have the same presentation time stamps. For example, source packet x1 from the first clip file 1, source packet y1 from the second clip file 2 and source packet z1 from the third clip file 3 have the same presentation time stamp T1. As such, the EP maps 1, 2 and 3 are time-aligned. Because of this time-alignment, seamless reproduction of video data is possible even when the reproduction path is changed during reproduction. FIG. 7 illustrates changes in reproduction path by two concentric circles. As shown, if a user decides to change the reproduction path from clip file 2 to clip file 1 during reproduction of the second clip file 2 and a change is permitted after reproduction of source packet y2, then after completing reproduction of source packet y2, source packet x3 is the next source packet reproduced. Similarly if a user decides to change reproduction path (e.g., change camera angle to view) from clip file 1 to clip file 3 during reproduction of clip file 1 and a change is permitted after reproduction of the source packet x4, then after completing reproduction of source packet x4, source packet z5 is reproduced. It will be understood that the source packet numbers given in the example above are merely exemplary, and that a source packet in one clip file will not, generally, have the same source packet number as a time aligned source packet in another clip file.

Figure 8:
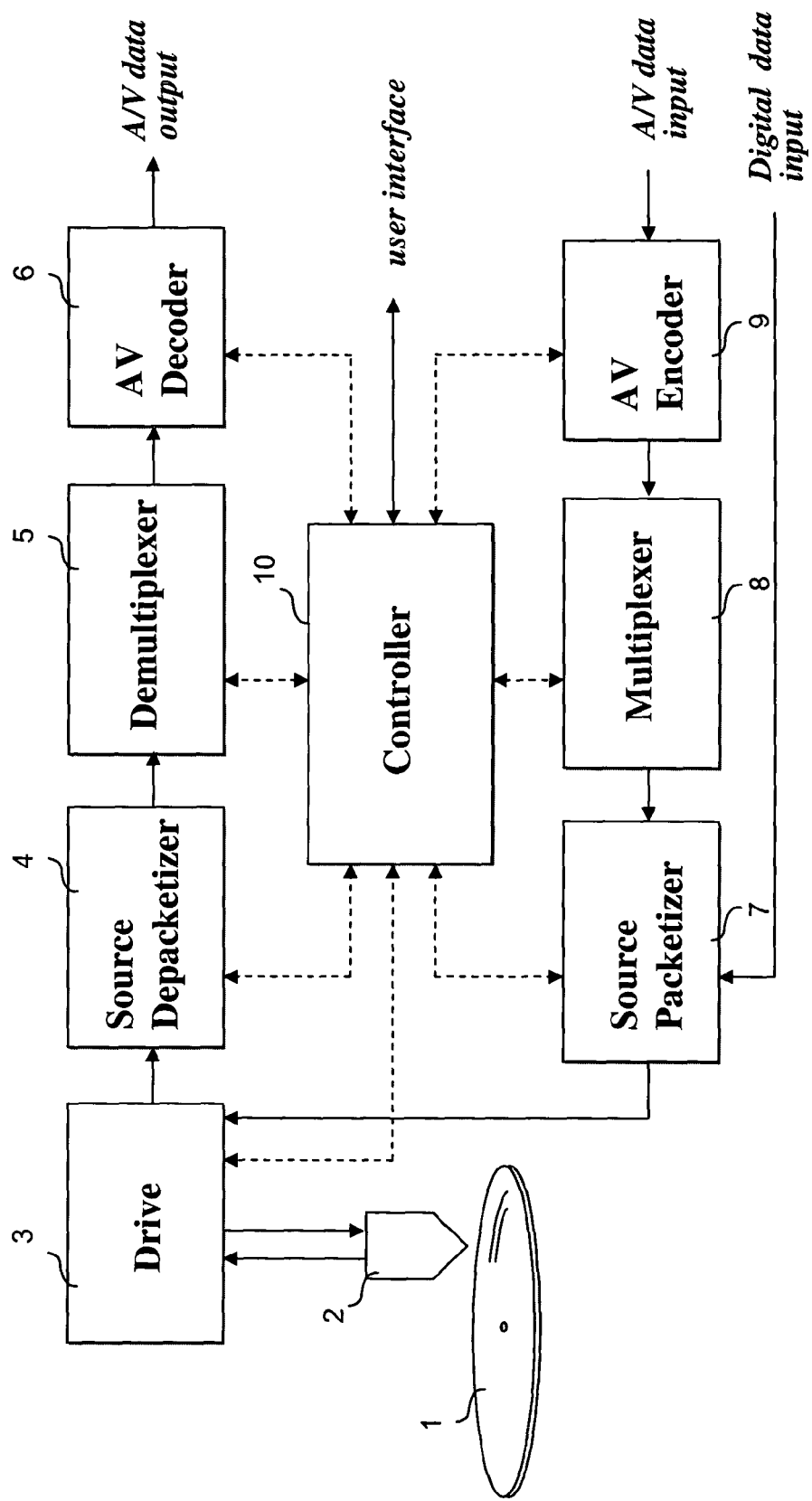
FIG. 8 illustrates a schematic diagram of an embodiment of an optical disk recording and reproduction apparatus of the present invention.

FIG. 8 illustrates a schematic diagram of an embodiment of an optical disk recording and reproducing apparatus according to the present invention. As shown, an AV encoder 9 receives and encodes audio and video data. The AV encoder 9 outputs the encoded audio and video data along with coding information and stream attribute information. A multiplexer 8 multiplexes the encoded audio and video data based on the coding information and stream attribute information to create, for example, an MPEG-2 transport stream. A source packetizer 7 packetizes the transport packets from the multiplexer 8 into source packets in accordance with the audio/video format of the optical disk. As shown in FIG. 8, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

The controller 10 also creates the navigation and management information for managing reproduction of the audio/video data being recorded on the optical disk. For example, based on information received via the user interface (e.g., instruction set saved on disk, provided over an intranet or internet by a computer system, etc.) the controller 10 controls the drive 3 to record the data structure of FIGS. 2, 4, and 5 and/or 6 on the optical disk.

During reproduction, the controller 10 controls the drive 3 to reproduce this data structure. Based on the information contained therein, as well as user input received over the user interface (e.g., control buttons on the recording and reproducing apparatus or a remote associated with the apparatus), the controller 10 controls the drive 3 to reproduce the audio/video source packets from the optical disk. For example, the user input may specify a path to reproduce. This user input may be specified, for example, via a menu based graphical user interface preprogrammed into the controller 10. Using the user input and the path management information reproduced from the optical disk, the controller 10 controls the reproduction of the specified path or changing the reproduction of the specified path as described in detail above with respect to the embodiments of the present invention.

The reproduced source packets are received by a source depacketizer 4 and converted into a data stream (e.g., an MPEG-2 transport packet stream). A demultiplexer 5 demultiplexes the data stream into encoded video and audio data. An AV decoder 6 decodes the encoded video and audio data to produce the original audio and video data that was feed to the AV encoder 9. During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform, instructs the demultiplexer 5 on the transport stream to demultiplex, and instructs the source depacketizer 4 on the source packet format.

While FIG. 8 has been described as a recording and reproducing apparatus, it will be understood that only a recording or only a reproducing apparatus may be provided using those portions of FIG. 8 providing the recording or reproducing function.

As apparent from the above description, the present invention provides a multi-path data stream managing method and apparatus for high-density optical discs that can rapidly and accurately select the data streams of the path designated by the user for reproduction and reproduce the selected data streams, while being capable of efficiently suppressing occurrence of a buffer underflow and an increase in buffer size.

As will be appreciated from the forgoing disclosure, the present invention provides a recording medium having a file or data structure that permits managing and/or controlling navigation of the reproduction of video data on a multiple reproduction path basis. Accordingly, the present invention provides a greater level of flexibility in the reproduction of video data than previously available.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. It is intended that all such modifications and variations fall within the spirit and scope of the invention.

What is claimed is:

1. An optical disk storing a data structure for managing reproduction of at least video data having multiple reproduction paths by a reproduction device, comprising:
   a data area for storing stream files, the stream files including at least a portion of the video data having multiple reproduction paths, the video data having multiple reproduction paths being divided into one or more interleaving units, each interleaving unit associated with one of the reproduction paths, the interleaving units associated with different reproduction paths being interleaved in the data area, and the video data in each interleaving unit including one or more entry points;
   a playlist area for storing playlist files, the playlist file including at least one playitem, the playitem identifying a playing interval in at least one clip of the video data, the playitem indicating at least one clip information file for an associated reproduction path used by the corresponding playitem; and
   a clip information area for storing clip information files, the clip information files for managing reproduction of the video data having multiple reproduction paths by the reproduction device, the clip information file including an entry point map associated with corresponding one reproduction path of the multiple reproduction paths, the entry point map mapping a presentation time stamp to an address for a corresponding entry point of the video data, each entry point map associated with a corresponding stream file and identifying the entry points in the video data for the associated reproduction path, the entry point map including path change information for identifying entry points at which enter to an associated reproduction path from another reproduction path is permitted and exit from the associated reproduction path to another reproduction path is permitted.

2. The optical disk of claim 1, wherein the video data having multiple reproduction paths is included in a plurality of stream files, each stream file including video data associated with one of the multiple reproduction paths, and each stream file including one or more of the interleaving units.

3. The optical disk of claim 1, wherein each interleaving unit in at least one stream file includes a same number of entry points.

4. The optical disk of claim 1, wherein at least two interleaving units in at least one stream file have a different number of entry points.

5. The optical disk of claim 1, wherein each entry point map indicates which of the identified entry points is a last entry point in an interleaving unit.

6. The optical disk of claim 1, wherein each entry point map indicates which of the identified entry points is a first entry point in an interleaving unit.

7. The optical disk of claim 1, wherein the entry point maps are aligned in time.

8. The optical disk of claim 2, wherein at least one interleaving unit starting and ending with a reproduction path change point.

9. An optical disk storing a data structure for managing reproduction of at least video data having multiple reproduction paths by a reproduction device, comprising:
   a data area for storing a plurality of stream files, each stream file including video data associated with one of the multiple reproduction paths, each stream file including entry points of video data, the entry points in each stream file being grouped into one or more interleaving units, and the plurality of stream files being interleaved in the data area on a interleaving unit basis, each interleaving unit including one or more entry points;

a playlist area for storing playlist files, the playlist file including at least one playitem, the playitem identifying a playing interval in a clip of the video data, the playitem indicating at least one clip information file for an associated reproduction path used by the corresponding playitem; and a clip information area for storing clip information files, the clip information files for managing reproduction of the video data having multiple reproduction paths by the reproduction device, the clip information file including an entry point map associated with corresponding one reproduction path of the multiple reproduction paths, the entry point map mapping a presentation time stamp to an address for a corresponding entry point of the video data, each entry point map associated with a corresponding stream file and identifying the entry points in the video data for the associated reproduction path, the entry point map including path change information for identifying entry points at which enter to a reproduction path from another reproduction path is permitted and exit from the associated reproduction path to another reproduction path is permitted.

10. The optical disk of clam 9, wherein each interleaving unit in at least one stream file includes a same number of entry points.

11. The optical disk of claim 9, wherein at least two interleaving units in at least one stream file have a different number of entry points.

12. An optical disk storing a data structure for managing reproduction of at least video data having multiple reproduction paths by a reproduction device, comprising:

a data area for storing stream files, the stream files including at least a portion of the video data having multiple reproduction paths, the video data having multiple reproduction paths being divided into one or more interleaving units, each interleaving unit associated with one of the reproduction paths, each interleaving unit being formed of one or more entry points, and the interleaving units associated with different reproduction paths being interleaved in the data area;

a playlist area for storing playlist files, the playlist file including at least one playitem, the playitem identifying a playing interval in a clip of the video data, the playitem indicating at least one clip information file for an associated reproduction path used by the corresponding playitem; and a clip information area storing clip information files, the clip information files for managing reproduction of the video data having multiple reproduction paths by the reproduction device, the clip information file including an entry point map associated with corresponding one reproduction path of the multiple reproduction paths, the entry point map mapping a presentation time stamp to an address for a corresponding entry point of the video data, each entry point map associated with a corresponding stream file and identifying the entry points in the video data for the associated reproduction path, the entry point map including path change information for identifying entry points at which enter to a reproduction path from another reproduction path is permitted and exit from the associated reproduction path to another reproduction path is permitted.

13. The optical disk of claim 12, wherein the number of entry points is fixed for at least interleaving units associated with a same reproduction path.

14. The optical disk of claim 12, wherein the number of entry points varies for at least interleaving units associated with a same reproduction path.

15. A method of recording a data structure for managing reproduction of at least video data having multiple reproduction paths on a recording medium, comprising:

recording playlist files in a playlist area of the recording medium, the playlist file including at least one playitem, the playitem identifying a playing interval in a clip of the video data, the playitem indicating at least one clip information file for an associated reproduction path used by the corresponding playitem;

recording the clip information files in a clip information area of the recording medium, the clip information files for managing reproduction of the video data having multiple reproduction paths, the clip information file including an entry point map associated with corresponding one reproduction path of the multiple reproduction paths, the entry point map mapping a presentation time stamp to an address for a corresponding entry point of the video data, each entry point map associated with a corresponding stream file and identifying the entry points in the video data for the associated reproduction path, the entry point map including path change information for identifying entry points at which enter to a reproduction path from another reproduction path is permitted and exit from the associated reproduction path to another reproduction path is permitted; and recording stream files in a data area of the recording medium, the stream files including at least a portion of the video data having multiple reproduction paths, the video data having multiple reproduction paths being divided into one or more interleaving units, each interleaving unit associated with one of the reproduction paths, and the interleaving units associated with different reproduction paths being interleaved in the data area, and the video data in each interleaving unit including one or more entry points.

16. The method of claim 15, wherein the video data having multiple reproduction paths is included in a plurality of stream files, each stream file including video data associated with one of the multiple reproduction paths, and each stream file including one or more of the interleaving units.

17. The method of claim 15, wherein at least one interleaving unit starting and ending with a reproduction path change point.

18. A method of reproducing a data structure for managing reproduction of at least video data having multiple reproduction paths recorded on a recording medium, comprising:

reproducing at least one playlist files from a playlist area of the recording medium, the playlist file including at least one playitem, the playitem identifying a playing interval in a clip of the video data, the playitem indicating at least one clip information file for an associated reproduction path used by the corresponding playitem;

reproducing the clip information files from a clip information area of the recording medium, the clip information files for managing reproduction of the video data having multiple reproduction paths, the clip information file including an entry point map associated with corresponding one reproduction path of the multiple reproduction paths, the entry point map mapping a presentation time stamp to an address for a corresponding entry point of the video data, each entry point map associated with a corresponding stream file and identifying the entry points in the video data for the associated reproduction path, the entry point map including path change information for identifying entry points at which enter to a reproduction path from another reproduction path is permitted and exit from the associated reproduction path to another reproduction path is permitted; and reproducing stream files from a data area of the recording medium, the stream files including at least a portion of the video data having multiple reproduction paths, the video data having multiple reproduction paths being divided into one or more interleaving units, each interleaving unit associated with one of the reproduction paths, and the interleaving units associated with different reproduction paths being interleaved in the data area, and the video data in each interleaving unit including one or more entry points.

19. The method of claim 18, wherein the video data having multiple reproduction paths is included in a plurality of stream files, each stream file including video data associated with one of the multiple reproduction paths, and each stream file including one or more of the interleaving units.

20. An apparatus for recording a data structure for managing reproduction of at least video data having multiple reproduction paths on a recording medium, comprising:
an optical pickup configured to record data on the recording medium; and
a controller, operably coupled to the optical pickup, configured to record playlist files in a playlist area of the recording medium, the playlist file including at least one playitem, the playitem identifying a playing interval in a clip of the video data, the playitem indicating at least one clip information file for an associated reproduction path used by the corresponding playitem;
the controller configured to control the optical pickup to record clip information files in a clip information area of the recording medium, the clip information files for managing reproduction of video data having the multiple reproduction paths, the clip information file including an entry point map associated with a corresponding one reproduction path of the multiple reproduction paths, the entry point map mapping a presentation time stamp to an address for a corresponding entry point of the video data, each entry point map associated with a corresponding stream file and identifying the entry points in the video data for the associated reproduction path, the entry point map including path change information for identifying entry points at which enter to a reproduction path from another reproduction path is permitted and exit from the associated reproduction path to another reproduction path is permitted, and
the controller configured to control the optical pickup to record stream files in a data area of the recording medium, the stream files including at least a portion of the video data having multiple reproduction paths, the video data having multiple reproduction paths being divided into one or more interleaving units, each interleaving unit associated with one of the reproduction paths, the interleaving units associated with different reproduction paths being interleaved in the data area, and the video data in each interleaving unit including one ore more entry points.

21. The apparatus of claim 20, wherein each interleaving unit in at least one stream file includes a same number of entry points.

22. The apparatus of claim 20, wherein at least two interleaving units in at least one stream file have a different number of entry points.

23. The apparatus of claim 20, further comprising:
an encoder configured to encode the video data having multiple reproduction paths.

24. The apparatus of claim 20, further comprising:
a source packetizer configured to packetize the video data.

25. An apparatus for reproducing a data structure for managing reproduction of at least video data having multiple reproduction paths recorded on a recording medium, comprising:
an optical pickup configured to reproduce data recorded on the recording medium;
a controller, operably coupled to the optical pickup, configured to control the optical pickup to reproduce at least one playlist files in a playlist area of the recording medium, the playlist file including at least one playitem, the playitem identifying a playing interval in a clip of the video data, the playitem indicating at least one clip information file for an associated reproduction path used by the corresponding playitem;
the controller configured to control the optical pickup to reproduce clip information files from a clip information area of the recording medium, the clip information files for managing reproduction of the video data having multiple reproduction paths, the clip information file including an entry point map associated with corresponding one reproduction path of the multiple reproduction paths, the entry point map mapping a presentation time stamp to an address for a corresponding entry point of the video data, each entry point map associated with a corresponding stream file and identifying the entry points in the video data for the associated reproduction path, the entry point map including path change information for identifying entry points at which enter to a reproduction path from another reproduction path is permitted and exit from the associated reproduction path to another reproduction path is permitted; and
the controller configured to control the optical pickup to reproduce stream files from a data area of the recording medium, the stream files including at least a portion of the video data having multiple reproduction paths, the video data having multiple reproduction paths being divided into one or more interleaving units, each interleaving unit associated with one of the reproduction paths, the interleaving units associated with different reproduction paths being interleaved in the data area, and the video data in each interleaving unit including one or more entry points.

26. The apparatus of claim 25, wherein each interleaving unit in at least one stream file includes a same number of entry points.

27. The apparatus of claim 25, wherein at least two interleaving units in at least one stream file have a different number of entry points.

28. The apparatus of claim 25, further comprising:
a source de-packetizer configured to de-packetize a packet of the video data.

* * * * *